June 13, 1933.  J. CARRIE  1,914,007

WIRE NETTING FOR WIRE GLASS

Filed Jan. 13, 1930

INVENTOR
James Carrie
by William B. Jaspert.
Attorney.

Patented June 13, 1933

1,914,007

UNITED STATES PATENT OFFICE

JAMES CARRIE, OF BUTLER, PENNSYLVANIA, ASSIGNOR TO FRANK W. PRESTON, OF BUTLER, PENNSYLVANIA

WIRE NETTING FOR WIRE GLASS

Application filed January 13, 1930. Serial No. 420,426.

This invention relates to a wire netting for wire glass, and it is among the objects thereof to provide a wire netting having a uniform mesh pattern of such design that the glass may be glazed in more than one direction, whereby the excess wastage produced in glazing standard forms of wire glass employing the common form of chicken wire is greatly eliminated.

Another object of the invention is the provision of wire netting for wire glass in which the twists of the netting run uniformly in opposite directions, transversely of each other and in uniform spaced relation, and which is esthetically more pleasing than the standard form of wire netting heretofore employed.

Heretofore the so-called chicken-wire netting was employed in the manufacture of wire glass and this netting is of hexagonal form with its double strands disposed in one direction only, and all double strands were disposed parallel with the length of the sheet or plate. When the glass was glazed, the double strands would lie in an up-and-down direction, and if a pane were glazed with the double strands running in a different direction, it had an odd appearance and was out of place among its mates. Accordingly, to produce a uniform appearance in the glazing of wire glass, there was considerable wastage in cutting which is avoided by the present invention in which the double strands are made to run uniformly in two directions.

The invention will be more fully described in connection with the accompanying drawing, in which:—

Figure 1:
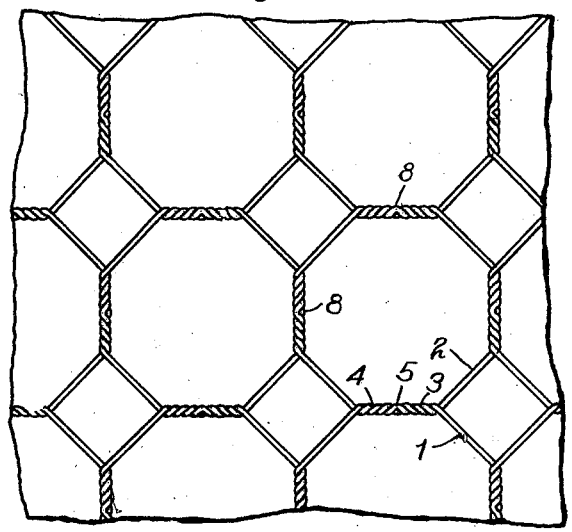
Figure 2:
Figure 2:
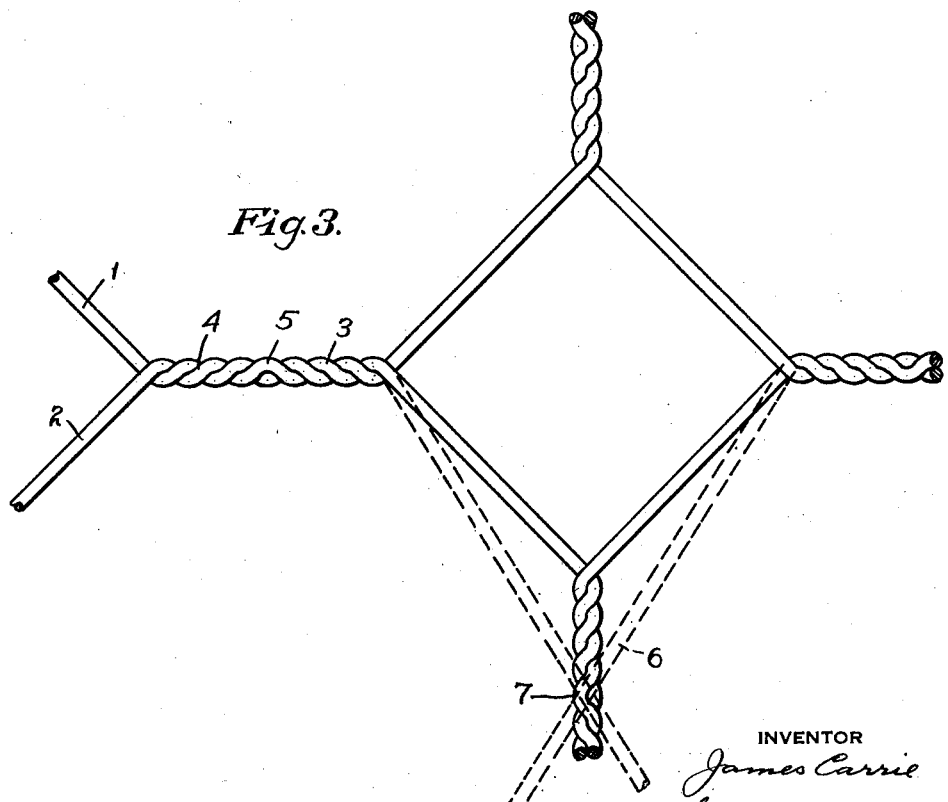

Figure 1 is a plan view of a portion of wire glass embodying wire netting or mesh in accordance with the present invention;

Figure 2 a cross-sectional view thereof; and

Figure 3 an enlarged detail of a portion of the wire netting illustrating the nature of the twists and the manner of their development.

With reference to Fig. 3 of the drawing, the wire strands 1 and 2 may be of substantially the same gage as the common form of chicken wire and are twisted in a manner to produce a left and right-hand helix 3 and 4 terminating in the center of the twist, as at 5. The twisting is accomplished by placing one mesh of straight wires upon another mesh with the wires crossing at the proper angle, as shown in the dotted line construction 6 of Fig. 3. A gripping tool is then clasped around the overlapping strands at 7 and subjected to angular movement whereby the wire strands form a left and right-hand twist or helix as shown. If this is done under sufficient tension, the twists hold just as well as the regular type of woven wire now in use, and in practice the wire is first twisted in one row and then in another row to form the twists in two directions, as shown in the accompanying illustrations.

The twisted wire or netting is then embedded in the glass in any of the well-known manners by rolling the glass therewith to form a wire glass as shown in Figures 1 and 2.

As shown in Figure 1, the twists generally designated at 8 lie in transverse planes so that in glazing the plate may be cut in two directions at an angle of 90° without disturbing the esthetic appearance of the glass panes relative to each other, since they must essentially all be uniform.

It is apparent from the foregoing description of this invention that wire glass embodying the double-twisted wire netting therein described, eliminates the waste incurred in the glazing of wire glass embodying the common form of chicken wire, and furthermore, the double-twisted wire strands produce a more uniform and esthetically better appearing glass than wire netting as heretofore utilized.

Although the double strand of the netting has been herein illustrated as twisted, it will be obvious to those skilled in the art that the double strands may be joined by welding or in any other suitable manner without departing from the principles herein set forth.

I claim herein as my invention:

1. A metallic core for wire glass comprising a mesh, adjacent units of which are octagons with length equal to breadth to adapt the glass for glazing in two directions at an angle of 90° and having their overlapping strands twisted in a left and right hand helix.

2. A metallic core for wire glass comprising a mesh, adjacent units of which are octagons with length equal to breadth to adapt the glass for glazing in two directions at an angle of 90° and having four sides of double helical twists.

In testimony whereof I have hereunto set my hand and seal this 4th day of January, 1930.

JAMES CARRIE.